United States Patent
Turner, III

(10) Patent No.: US 9,912,004 B2
(45) Date of Patent: Mar. 6, 2018

(54) SYSTEM FOR ASSEMBLING A BATTERY MODULE

(71) Applicant: GM Global Technology Operations LLC, Detroit, MI (US)

(72) Inventor: Raymond D. Turner, III, Oxford, MI (US)

(73) Assignee: GM Global Technology Operations LLC, Detroit, MI (US)

(*) Notice: Subject to any disclaimer, the term of this patent is extended or adjusted under 35 U.S.C. 154(b) by 98 days.

(21) Appl. No.: 14/718,140

(22) Filed: May 21, 2015

(65) Prior Publication Data

US 2015/0255826 A1    Sep. 10, 2015

Related U.S. Application Data

(62) Division of application No. 13/835,858, filed on Mar. 15, 2013, now Pat. No. 9,048,462.

(60) Provisional application No. 61/617,171, filed on Mar. 29, 2012.

(51) Int. Cl.
  *H01M 2/00* (2006.01)
  *H01M 10/04* (2006.01)

(52) U.S. Cl.
  CPC ......... *H01M 10/0404* (2013.01); *H01M 2/00* (2013.01); *H01M 10/049* (2013.01); *H01M 10/0481* (2013.01); *Y10T 29/49004* (2015.01); *Y10T 29/49108* (2015.01); *Y10T 29/53022* (2015.01); *Y10T 29/53135* (2015.01)

(58) Field of Classification Search
  CPC ............ H01Q 1/12; H01Q 1/243; H01Q 1/38
  See application file for complete search history.

(56) References Cited

U.S. PATENT DOCUMENTS

| | | |
|---|---|---|
| 3,519,489 A | 7/1970 | Port |
| 3,841,915 A | 10/1974 | Eberle |
| 4,510,682 A | 4/1985 | Sabatino et al. |
| 4,824,307 A | 4/1989 | Johnson et al. |
| 5,534,364 A | 7/1996 | Watanabe et al. |
| 5,840,087 A | 11/1998 | Gozdz et al. |
| 6,800,100 B2 | 10/2004 | Benson et al. |

(Continued)

FOREIGN PATENT DOCUMENTS

CN         102376975 A        3/2012

*Primary Examiner* — Minh Trinh
(74) *Attorney, Agent, or Firm* — Quinn IP Law

(57) ABSTRACT

A battery pack assembly and a method of making the same. The method includes using lifters with a cammed conveyor delivery mechanism to facilitate edgewise stacking of generally planar battery cells. The lifter spacing and cam profile are designed in such a way as to orient individual battery cell tabs and cooling fin assemblies to keep them close together but without applying significant forces to the stackable components. Combining conveyor streams allows components to be processed in parallel and sequenced correctly onto a single conveyor. Use of lifter integrated conveyor belt with cams and guides for individual battery cell orientation and sequencing promotes high speed assembly without a need to change component directions. The use of high-speed component delivery high is compatible with allowing more component placement variation, while the edgewise orientation of the components being assembled permits the use of small manufacturing footprints.

12 Claims, 6 Drawing Sheets

(56) References Cited

U.S. PATENT DOCUMENTS

| | | |
|---|---|---|
| 7,625,665 B2 | 12/2009 | Jeon et al. |
| 8,353,970 B2 | 1/2013 | Wells et al. |
| 8,895,173 B2 | 11/2014 | Gandhi et al. |
| 9,048,462 B2 * | 6/2015 | Turner, III ............. H01M 2/00 |
| 2006/0177731 A1 | 8/2006 | Lambert |
| 2013/0255068 A1 | 10/2013 | Turner, III |

* cited by examiner

SYSTEM FOR ASSEMBLING A BATTERY MODULE

CROSS REFERENCE TO RELATED APPLICATIONS

This application is a divisional of co-pending application Ser. No. 13/835,858, filed Mar. 15, 2013 which claims priority to U.S. Provisional Application 61/617,171, filed Mar. 29, 2012.

BACKGROUND OF THE INVENTION

This invention relates generally to a way to improve the manufacture of individual battery cells into assembled modules, and more particularly to the assembly of such battery modules with a throughput process.

The increasing demand to improve vehicular fuel economy and reduce vehicular emissions has led to the development of both hybrid vehicles and pure electric vehicles. Pure electric vehicles may be powered by a battery pack (which is made up of numerous smaller modules or cells), while hybrid vehicles include two or more energy sources, such as a gasoline (also referred to as an internal combustion) engine used as either a backup to or in cooperation with a battery pack. There are two broad versions of hybrid vehicles currently in use. In a first version (known as a charge-depleting hybrid architecture), the battery can be charged off a conventional electrical grid such as a 120 VAC or 240 VAC power line. In a second version (known as a charge-sustaining hybrid architecture), the battery receives all of its electrical charging from one or both of the internal combustion engine and regenerative braking. In one form of either version, the pack is made from numerous modules, which in turn are made up of numerous individual cells.

Typically, the individual cells that make up a module are of a generally planar (or prismatic) structure that includes alternating stacks of sheet-like positive and negative electrodes having a similarly-shaped electrolytic separator disposed between each positive and negative electrode pair; these separators are used to prevent physical contact between positive electrodes and negative electrodes within each cell while enabling ionic transport between them. In one form, the separators are configured to absorb the liquid electrolyte of the cell. Cooling features are also frequently employed to convey away the heat generated by the various individual cells during the charging and discharging activities associated with battery operation; in one form, such cooling features may be formed as yet another generally planar sheet-like device that can be added between the various cells as part of the stacked arrangement of components that make up the module. Connection tabs extend from a peripheral edge of each cell to allow mechanical and electrical connection between the electrodes of the individual battery cells. Proper alignment of the various tabs is generally required to ensure low electrical resistance to bus bars or related conductors, as well as for robust mechanical connectivity. These prismatic cells typically have either a soft, flexible case (called "pouch cells") or a hard rigid case (called "can cells"). Depending on the application, the individual battery cells may be arranged in series, parallel or combinations thereof to produce the desired voltage and capacity. Numerous frames, trays, covers and related structure may be included to provide support for the various cells, modules and packs, and as such help to define a larger assembly of such cells, modules or packs.

The current common practice for handling cells during assembly is by using discreet carriers. In one form, it is known to manufacture a battery module assembly by using robotic "pick and place" component transport systems. Such approaches remove the cells from the shipping dunnage, transfer the cells via conveyor to an initial process step (typically in the form of electrical verification) and then transfer them via pick and place to the high precision carrier. Such approaches are useful for assembling layered cells that have tight placement tolerance requirements, as well as those with special handling needs. While this method is effective for protecting the cell during the assembly operation, it also leads to expensive tooling and wasted assembly time to locate the carrier in position, remove the part for the specific station operation and then return the part to the carrier to move to the next operation. This in turn forces packaging and tooling operations to become more complex and expensive.

SUMMARY OF THE INVENTION

According to an aspect of the present invention, a method of assembling battery pack components into a battery module assembly is disclosed. The method includes combining a substantially planar battery cell and a substantially planar cooling fin such that they contact each other along a common face. From this, the cell and fin combination is reoriented such that this facingly adjacent contact goes from being in a substantially horizontal plane on the conveyor mechanism to a substantially vertical plane, after which numerous of the now vertically-oriented combinations are aligned between end plates along the longitudinal axis that is formed by the conveyor mechanism. Once this alignment is completed, the stack made up of numerous aligned cell and fin combinations and end plates is compressed along the axis that is formed substantially normal to the planar interface between the cells and the fins; this substantially normal is preferably along the same longitudinal axis formed by the conveyor mechanism. Once the cells and related components (such as cooling fins, end plates or the like) making up the stack have been properly compressed, at least a portion of the stack is enclosed within a suitable support structure and then connected to one or more electric circuit components to form an assembled module. The system used to do the conveying and stacking forms an integrated whole made up of a stationary cammed structure (also referred to herein as a cam), rollers, lifters and conveyor belt. As a belt or related generally planar conveying surface moves, the cam profile changes the cell orientation for the next operation. Benefits of the system of the present invention include low cost, high speed assembly of battery modules and battery packs by eliminating the need for high precision packaging and tooling. Furthermore, the system promotes reduced part cost by allowing more dimensional variation than from a traditional "pick and place" system.

According to another aspect of the present invention, a method of stacking individual cells of a larger battery module or battery pack is disclosed. The method includes combining a first and second substantially planar battery cell and a respective first and second substantially planar cooling fin such that facingly adjacent contact is established between them. The positive and negative tabs that extend from the edges of the cells of the first cell and fin combination make up a tab pair that defines a first tab orientation, while those that extend from the edges of the cells of the second cell and fin combination make up a tab pair that defines a second tab orientation. Both cell and fin combinations are conveyed in a manner to change the orientation from a substantially horizontal plane to a substantially vertical plane; once in the generally vertical orientation, they are placed in an alternating (i.e., interspaced) arrangement along the conveying mechanism (in addition to—on an as-needed basis—end plates). From there, they can be stacked on an outfeed carrier or related receiving tool or platform for compression or other subsequent steps.

According to yet another aspect of the present invention, a system for assembling a battery module is disclosed. The system includes a conveyor made up of at least two conveyor belts such that a first cell and fin combination (with one particular positive-to-negative tab orientation) is conveyed along a first of the conveyor belts while a second cell and fin combination defining a different particular positive-to-negative tab orientation is conveyed along a second of the conveyor belts. Numerous lifters help adjust the orientation of one or more of the cell and fin combinations along each of the first and second conveyor belts; these lifter are moved along a substantially vertical direction by the action of one or more cams such that openings or related voids in the conveyor belts permit the lifters to push up against one edge (preferably—but not necessarily—the leading edge) of the contact to effect a change in orientation of the cell and fin combinations. A substantially stationary guide is cooperative with one or more of the conveyor belts to promote an alternating aligned placement of the first and second cell and fin combinations (which are in their substantially vertical orientation) into a stack. Additional devices to receive and compress the stack, as well as a device to place a support structure onto the stack while the stack is in its compressed state, are also included as part of the system, while a device to secure at least one electrical component to the supported stack is also included. In another form, the conveyors, cams, lifters and guides are configured as a stacking system for use in providing the alternating alignment of the first and second cell/fin combinations (along with the appropriate end plates and ancillary structure) into the desired stacked relationship.

BRIEF DESCRIPTION OF THE DRAWINGS

The following detailed description of specific embodiments can be best understood when read in conjunction with the following drawings, where like structure is indicated with like reference numerals and in which.

DETAILED DESCRIPTION OF THE PREFERRED EMBODIMENTS

Figure 1:
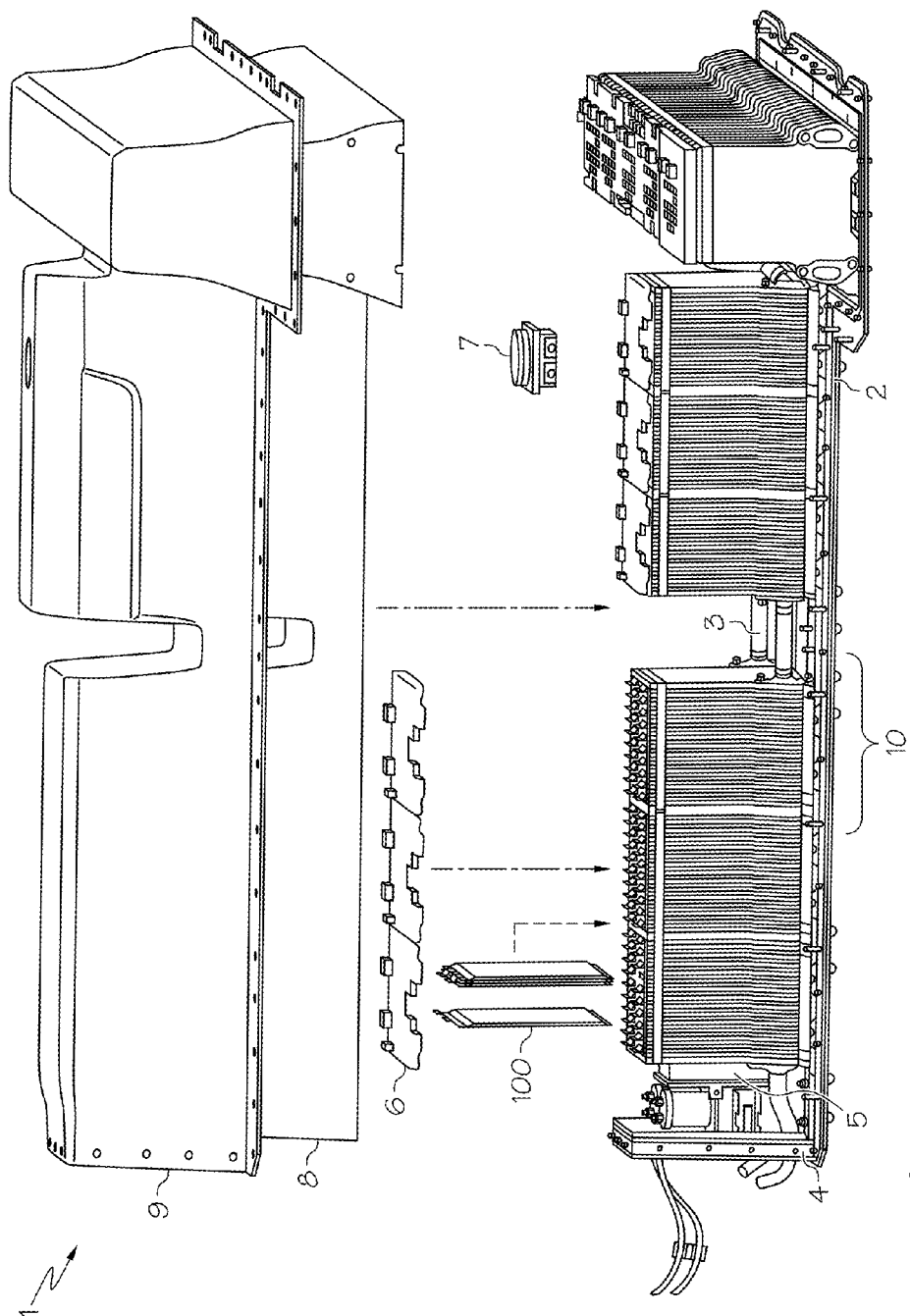
FIG. 1 shows a notional vehicular propulsion system in the form of a battery pack.

Referring initially to FIG. 1, a battery pack 1 employing numerous battery modules 10 with cells 100 is shown in a partially-exploded view. Depending on the power output desired, numerous battery modules 10 may be combined into larger groups or sections; such may be aligned to be supported by a common tray 2 that can also act as support for coolant hoses 3 where supplemental cooling may be desired. In the present context, the terms "battery cell", "battery module" and "battery pack" (as well as their shortened variants "cell", "module" and "pack") are use to describe different levels of components of an overall battery-based power system, as well as their assembly. For example, numerous individual battery cells form the building blocks of battery modules. Numerous battery modules (in conjunction with ancillary equipment) in turn make up the completed battery pack.

A bulkhead 4 may define a primary support structure that can function as an interface for the coolant hoses 3, as well as house a battery disconnect unit in the event battery service is required. In addition to providing support for the numerous battery modules 10, tray 2 and bulkhead 4 may support other modules, such as a voltage, current and temperature measuring module 5. Placement of individual battery cells 100 (to be discussed in more detail below) within one of battery modules 10 is shown, as is the covering thereof by a voltage and temperature sub-module 6 in the form of plug connections, busbars, fuses or the like. Although shown notionally in a T-shaped configuration, it will be appreciated by those skilled in the art that battery pack 1 may be formed into other suitable configurations as well. Likewise, battery pack 1 may include—in an exemplary configuration—between about two hundred and three hundred individual battery cells 100, although (like the arrangement) the number of cells 100 may be greater or fewer, depending on the power needs of the vehicle. In one exemplary form, battery pack 1 is made up of three sections a first of which consists of two modules 10 with thirty six cells 100 in each module 10 to make a seventy two cell section located along the vehicular longitudinal axis of the T-shaped battery pack 1, a second of which consists of two modules 10 with thirty six cells 100 in each module 10 and one module with eighteen cells 100 to make a ninety cell section (also located along the vehicular longitudinal axis) and a third (located on the vehicular lateral axis of the T-shaped battery pack 1) made up of three modules 10 with thirty six cells 100 in each module 10 and one module with eighteen cells 100 to make a one hundred and twenty six cell section for a total of two hundred and eighty eight such cells. Other features, such as manual service disconnect 7, insulation 8 and a cover 9 complete the battery pack 1. In addition to the aforementioned battery disconnect unit, other power electronic components (not shown) may be used, including a battery management system or related controllers.

Figure 2:
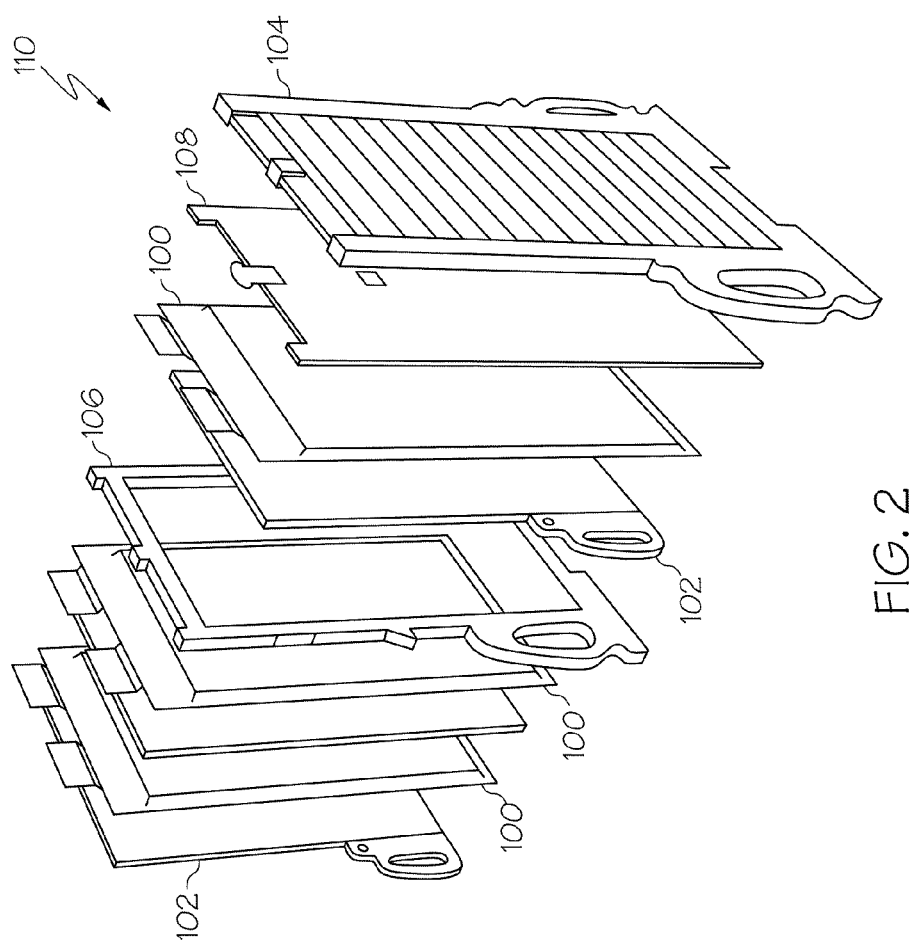
FIG. 2 shows in separated form various battery components used in the battery pack of FIG. 1.

Referring next to FIG. 2, one embodiment of a portion (also referred to herein as a subassembly 110) of a battery module 10 is shown in an exploded view. In order to form the module 10, at least some of the components discussed below may be arranged in a repeating stack-like manner in the subassembly 110 made up of multiple cells 100. End frame (also called end plate) 104 and repeating frame 106 form the basis for the subassembly's structure, where each repeating frame 106 may serve to provide a secure mounting position for a corresponding cell 100. Furthermore, liquid-bearing cooling fins (or plates) 102 may be placed in thermal communication with the battery cells 100 as a way to further augment heat capacity and subsequent heat transfer; their proximity to a corresponding one of repeating frames 106 allows for a convenient securing location in a manner generally similar to that of cells 100. The end frames 104 and repeating frames 106 are typically made of a light-weight, non-conductive material, such as plastics (for example, polypropylene, nylon 6-6) and other low-cost materials, and can be fiber-reinforced for structural strength, if desired. In an optional form, an insulative sheet 108 may be placed between the battery cell 100 and the cooling fin 102 or frames 104, 106 to protect the battery cell 100. In a preferred form, insulative sheet 108 is made of a plastic or related material, and may be affixed to cooling fin 102.

In particular, the numerous individual battery cells 100 define a generally prismatic construction made up of an anode and a cathode separated by an electrolytic membrane (details not shown). In a preferred form, the cells 100 are made from a lithium-ion compound or related composition well-known to those skilled in the art for providing an electrochemical reaction. Positive and negative connection tabs extend outwardly from a peripheral edge of the respective anode and cathode to provide electrical connectivity with other battery cells. The tabs are preferably formed from aluminum-based (positive tab) and copper-based (negative tab) materials, and are often dissimilar to one another. Joining processes, such as by various forms of welding, may be employed to form the necessary mechanical and electrical connection between tabs. Likewise, the related structure of the frames 104, 106, cooling plate 102 and insulative sheet 108 (where any of the last three are present) define a similar generally prismatic-shaped construction and are typically placed between adjacent cells in a stacked arrangement as shown. In one form, the end frame 104 may be in the form of a plate that serves as containment structure for the assembled stack of individual cells 100. In one projected embodiment, a stacked module 10 is made up of two endplates 104, thirteen cooling plates 102, and twelve prismatic can cells for a total of twenty seven parts.

Figure 3:
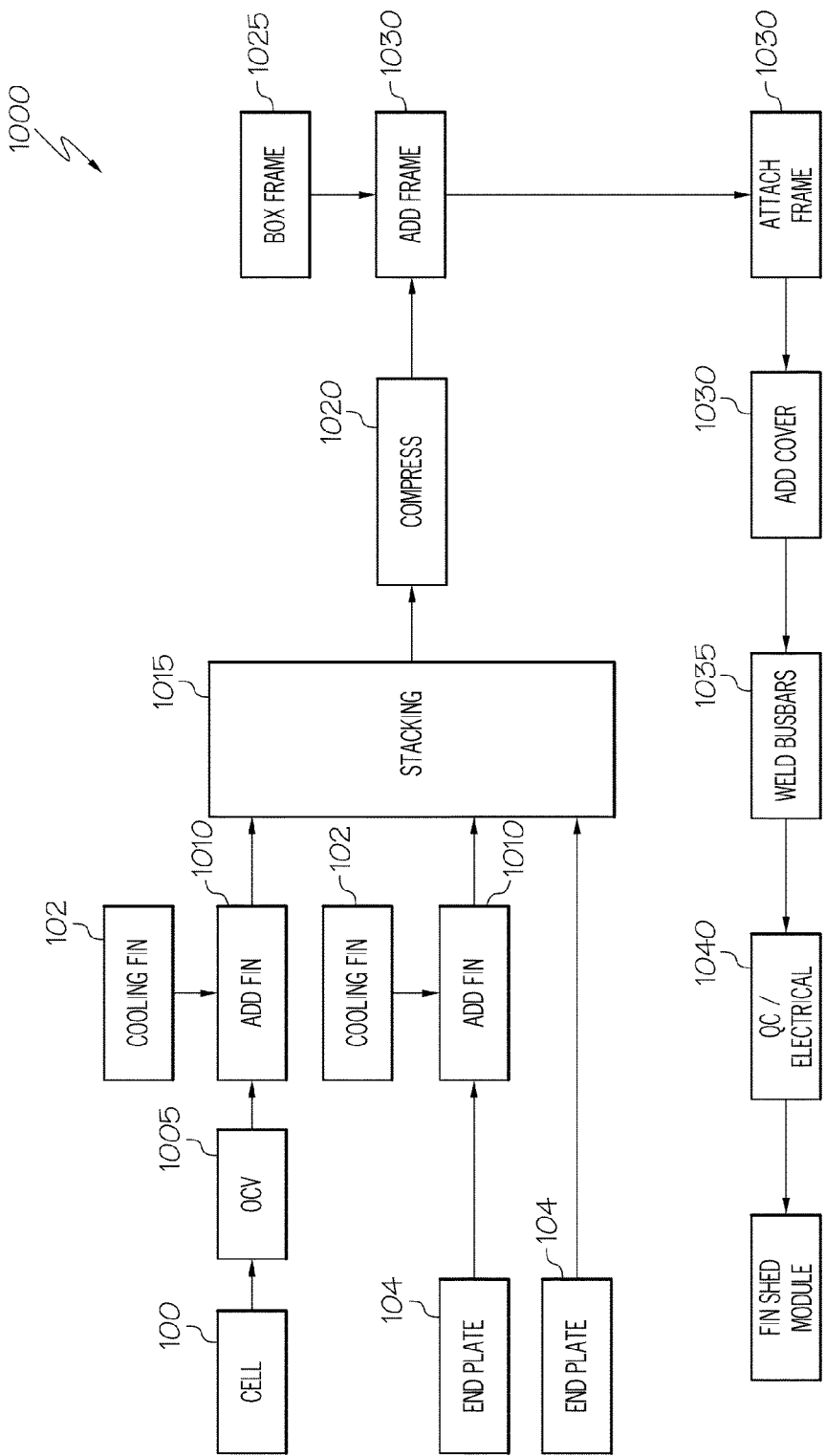
FIG. 3 shows a process flow used to produce a battery module according to an aspect of the present invention.

Referring next to FIGS. 3 through 6, a method 1000 of manufacturing numerous battery subassemblies 110 into various modules 10 with a high throughput assembly line according to an aspect of the present invention is shown. While the subassemblies 110 depicted herein are shown using can cell construction, it will be appreciated by those skilled in the art that it could be applied to pouch cell configurations as well. Significantly, the assembly line 1100 constitutes a single line (rather than multiple lines) for module 10 assembly. Referring with particularity to FIG. 3, an overview of the most significant steps in the process are shown, where at first individual cells 100 are first subjected to open circuit voltage (OCV) testing 1005 to determine their electrical suitability. In one form, the cells 100 are offloaded from a magazine (not shown) or related carrier. By way of example, the magazine may have numerous apertures defined therein to allow ease of access for the tester (not shown). Once an individual cell 100 has been found through the tester to be satisfactory, it is moved (such as by a pusher or related device (not shown)) onto the assembly line 1100, at which time a cooling fin 102 can be added 1010 to be placed in facing arrangement with the cell 100. Parallel activities can take place with the end plate 104 and cooling fins 102 (save the need for conducting OCV testing on the end plate 104). Once all of the cells 100, cooling fins 102 and related components (such as end plates 104) have been assembled, they move on to a stacking operation 1015 where they are aligned for subsequent compression 1020 along their longitudinal axis to a predetermined force and displacement. It will be appreciated by those skilled in the art, that the force and displacement for compression will be related to the cell chemistry and cooling fin design with typical compression forces ranging from one hundred to four thousand Newtons and a compressive displacement of one to thirty millimeters) and then encased within a suitable box-like structure 1025 during a framing and covering operation 1030. From there, busbars and related electrical connections (which may be a part of the aforementioned voltage and temperature sub-module 6) and subsequent quality control and electrical testing 1040 are conducted.

Figure 4:
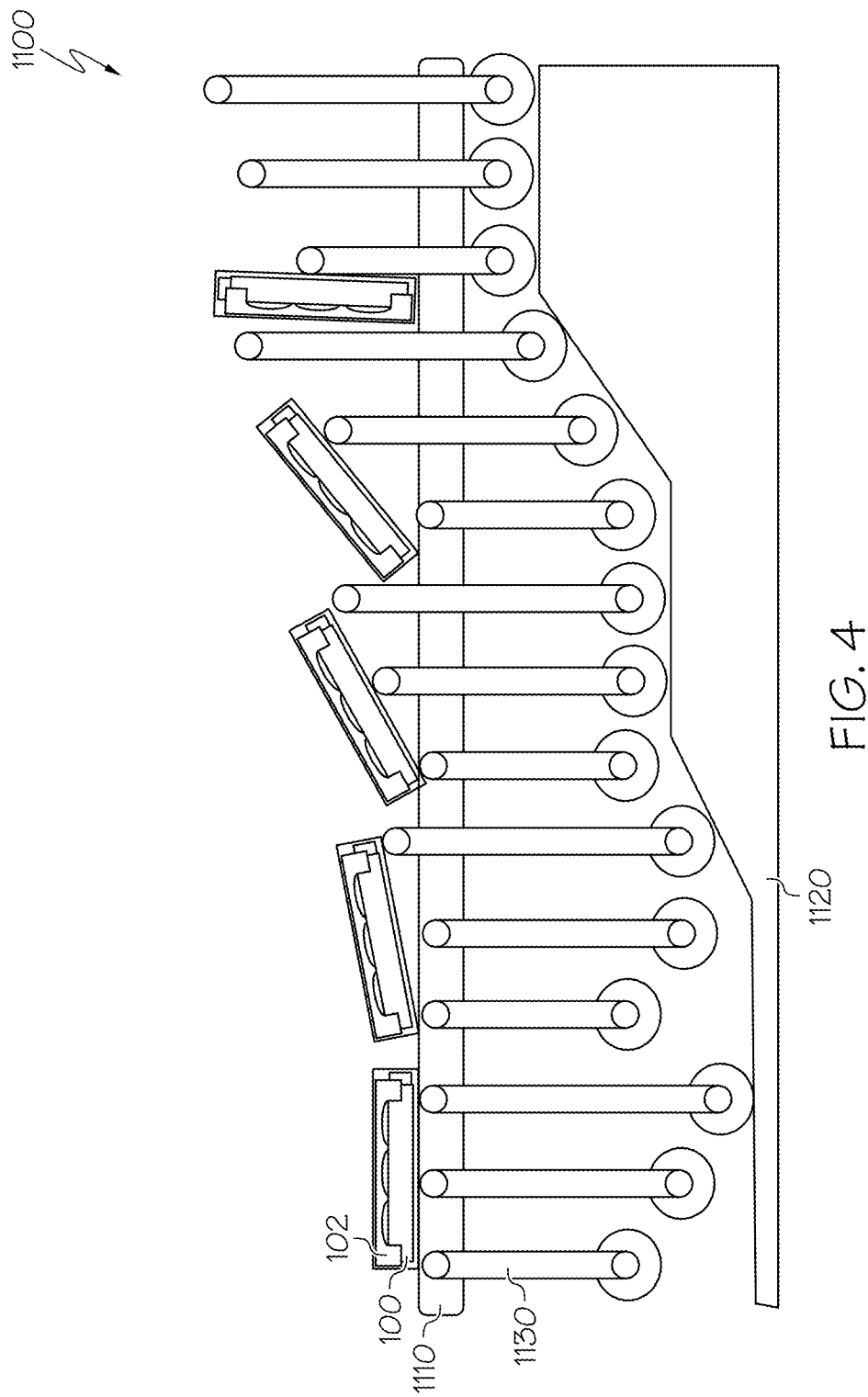
FIG. 4 shows a first portion of the stacking operation of FIG. 3.

Referring with particularity to FIG. 4 in conjunction with FIG. 3, an edgewise elevation view of the assembly line (or tooling) system 1100 is shown with conveyor 1110 cooperating with a plurality of cams 1120 and wheeled lifters 1130 to change the stacking orientation of each individual cell 100 and cooling fin 102 combination used in a battery module according to an aspect of the present invention. In one preferred (although not necessary) form, the cooling fin 102 is about 10 millimeters in depth, while the cell 100 is about 12 millimeters in depth. In the view shown, the conveyor 1110 (which is in belt form in one particular embodiment) moves the generally horizontally-oriented cells 100 in a left-to-right direction to allow the profile of the cams 1120 to push the downwardly-biased (through, for example, gravity or spring-loading) lifter 1130 upward through openings formed along the conveyor 1100. This in turn causes the cells 100 to change from their horizontal orientation at the left side to their substantially vertical orientation on the right side in preparation for stacking. Significantly, the lifter 1130 spacing (which in one form may be about 25 millimeters) and cam 1120 profile are designed in such a way as to orient the cells 100 without causing significant forces to be applied to the cells 100, cooling fins 102 and ancillary components or allowing them to separate from one another; however, adjacent lifters 1130 (which are actually plate-shaped devices) are close enough together such that once the individual cell 100/fin 102 combinations are moved into their vertical orientation, they are not free-standing when between such adjacent lifters 1130.

Figure 5:
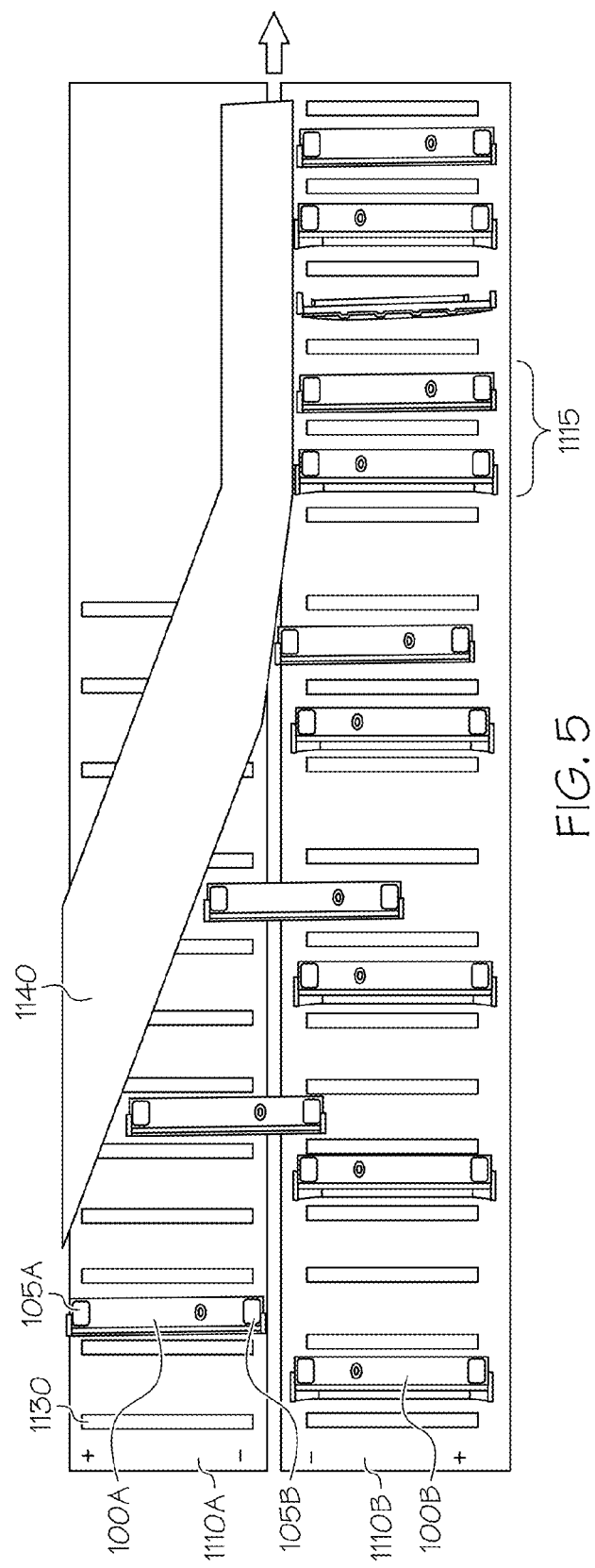
FIG. 5 shows a second portion of the stacking operation of FIG. 3.

Referring next to FIG. 5 in conjunction with FIG. 3, a top-down view of the alignment and stacking 1015 of the cells 100 of FIG. 4 is shown. As mentioned above, the lifters 1130 are of a generally plate-like shape that include a lateral dimension that extends across a majority of the width of the conveyor 1110. The stacking process is completed by indexing the cells 100 coming from parallel conveyors 1110 through one or more guides 1140 that position and support the parts while the lifters 1130 are retracted. Significantly, guides 1140 combine the two previously-separate conveyor streams 1110A and 1110B to allow parts to be processed in parallel and sequenced correctly onto a single conveyor 1110. In one form, the stationary guides 1140 may be of a hard plastic build to promote high wear resistance. Regarding the use of two parallel conveyors feeding into one, a first conveyor 1110A may move the now-vertical cells 100 such that the positive (i.e., aluminum-based) tab 105A of an underlying cell 100A in one conveyor 1110A stream is situated on a laterally-outward portion of the combined conveyor 1110 while the negative (i.e., copper-based) tab 105B is situated on a laterally-inward portion of the combined conveyor 1110. This first conveyor 1110A may correspond to a first tab position or orientation. Second conveyor 1110B is configured in a manner just the opposite, specifically having the tabs 105A and 105B from the underlying cell 100B situated such that once the respective subassemblies containing the first and second cells 100A, 100B are juxtaposed, the positive tab 105A from one cell is adjacent a negative tab 105B of the adjoining cell as shown in location 1115. This second conveyor 1110B may correspond to a second tab position or orientation. The close cooperation of the guide 1140 and the lifter 1130, coupled with suitable low coefficient of friction between them and the cells 100 help promote a secure fit of the facingly-adjacent cells 100 as they travel down the conveyor 1110 while waiting for compression. It will be appreciated by those skilled in the art, that the choice of guide 1140 material, surface finish and geometry will depend on the cell and cooling fin materials, dimensions and assembly rate. As can be seen from the various changes in orientation that take place during cell 100 manipulation, the cell 100 and ancillary components (such as cooling fins 102, separators or the like) must be sufficiently attached to each other so that they do not come apart during such change in orientation that accompanies their movement along the assembly line 1100 made up of conveyor 1110, cams 1120, lifters 1130 and guide 1140. Furthermore, the surfaces of the cells 100 contacting the lifters 1130 must be sufficiently rigid to maintain their shape as the parts change orientation. Moreover, the cells 100 must have self-locating features to allow them to naturally nest against each other as they come together. In FIG. 4, the cooling fin 102 has features on the corner that engage the cell 100 that it is in facing arrangement with about four millimeters of material and a recess on the back of about four millimeters to capture the next cell. Such features permit the cells 100 to be processed on a simple conveyor-based assembly line 1100 without the need for precision carriers, thereby reducing otherwise wasted assembly steps. In one particular form, between about twelve and twenty four cell 100/cooling fin 102 combinations may be stacked between a pair of end plates 104 (one of which is shown traveling along second conveyor 1110B).

The use of an integrated approach between lifter 1130 and conveyor 1110 with cams 1120 and guides 1140 for cell 100 orientation and part sequencing facilitates high speed assembly for subassemblies 110 and related large format cells by positioning the parts to stack without a need to change directions such as that required with conventional pick and place-based equipment. Such a system as that presently disclosed not only accurately handles parts that are loosely assembled and travel at high speeds (which allows more part variation), but because the parts being assembled define an edgewise orientation, permit the use of small manufacturing footprints. The assembly line system 1100 is also easily scalable to higher or lower speeds, either by adjusting the line speed or by adjusting the system 1100 length. In contrast, a functionally-equivalent assembly approach using traditional pick and place systems or robots would require the use of complex articulating heads and tooling to constrain the components. The present inventor estimates that a system 1100 based on the present invention would run at approximately ten times faster than a pick and place-based system or robotic-based system; as well as occupy a significantly greater amount of manufacturing footprint and capital investment to support large manufacturing volumes.

Figure 6:
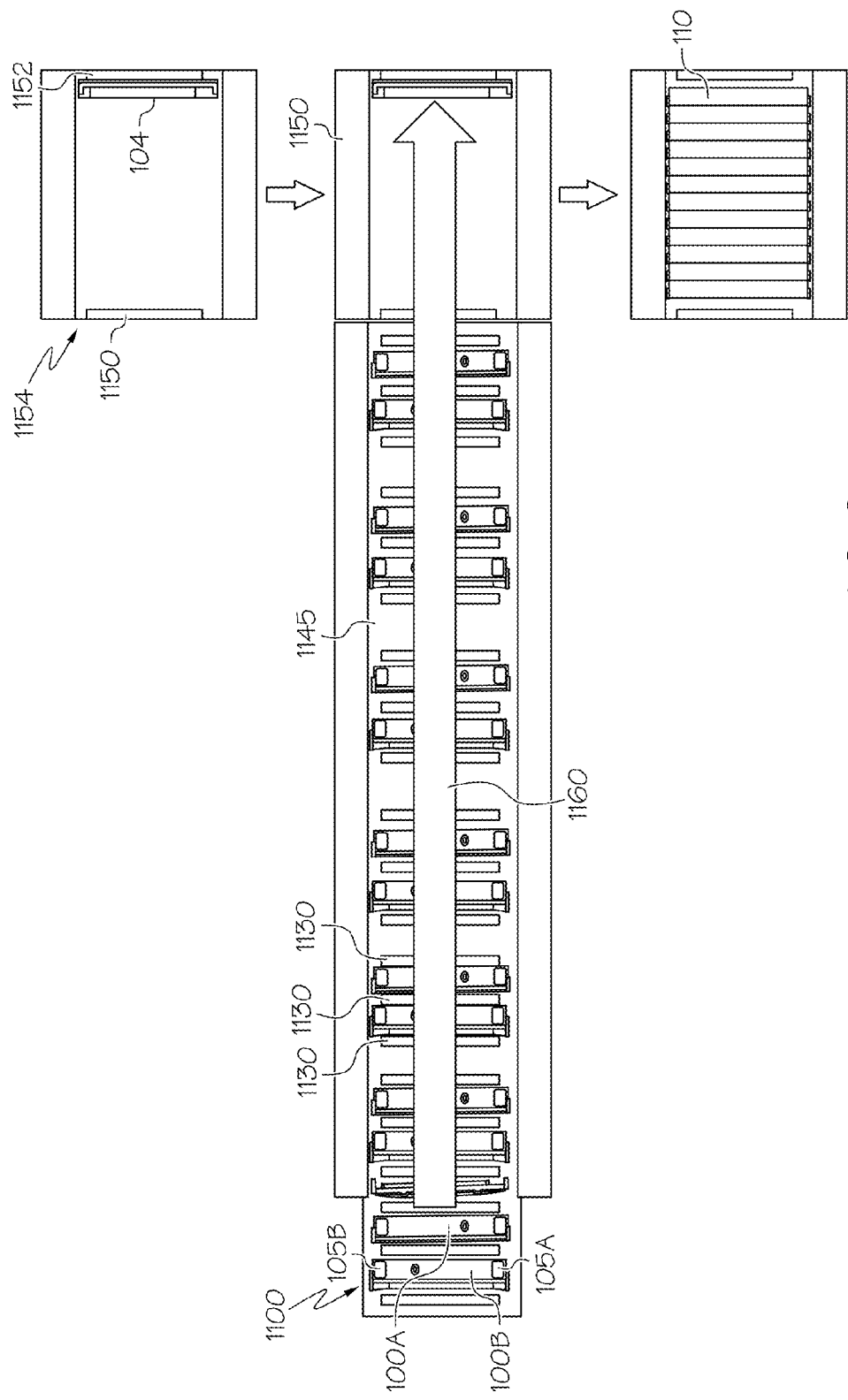
FIG. 6 shows removing the components from the conveyor line to complete the module stacking operation.

Referring next to FIG. 6 in conjunction with FIG. 3, the top-down view shows a group of aligned cells 100 that are then moved along conveyor 1110 in a left-to-right motion at a higher rate of speed than the conveyor onto a stationary holding tool 1150 which in one form may be configured as an outfeed carrier to receive the alternatingly-aligned cells 100. As shown, a single end plate 104 from FIG. 2 is shown placed in a facingly-adjacent relation with holding tool 1150. Additional guides 1145 having integrated brushes are situated along the conveyor 1110 to ensure continued alignment of the cells 100 during their travel. As the cells 100 move into these guides 1145, the lifters 1130 of FIGS. 4 and 5 are lowered and the cell 100 position and orientation is maintained by interference with the brushes. The group of cells 100 are then moved to the outfeed carrier 1150 using a motion that is faster than the conveyor 1100 speed. In this representation the motion is completed by a mechanical arm 1160 that indexes into position to capture the end cell group on the left and pull the cell groups to the right onto the outfeed carrier 1150. As such, the outfeed carrier 1150 is designed to guide the cells 100 to maintain alignment, and has a stationary holding tool 1152 situated along one axial end (shown presently as the right side) to locate the cells 100, and a moveable holding tool 1154 (shown presently as the axial end at the left side) that can retract to allow cells 100 to both move onto the outfeed carrier 1150 and be held in place during the transfer. Tool-mounted guides 1156 act to contain the lateral edges of the various cells 100 of the subassembly 110. In one preferred form, the surface of the outfeed carrier 1150 defines a suitably low coefficient of friction to facilitate the edgeward slide of the cells 100 across its surface. As shown, the outfeed carrier 1150 defines a box-like structure such that one or more of stationary holding tool 1152 and tool-mounted guides 1156 act as vertically upstanding members (i.e., walls) on various sides so that upon of the movable holding tool 1154 (which acts like its own upstanding structure) against an end of the stack, said stack becomes compressed in the box-like structure formed by the outfeed carrier 1150. Once all of the cells 100 that make up the module 10 are suitably aligned and placed onto the outfeed carrier 1150 as a subassembly 110, they are ready to receive support structure, electrical interconnectivity and other assembly as discussed in more detail below. In this present form, the subassembly 110 is considered to be a soft stack.

The soft stack of stacking operation 1015 is then subjected to a compressing operation 1020, where the outfeed carrier 1150 (with the subassembly 110 placed edgewise on it and contained axially by the stationary holding tool 1152 and moveable holding tool 1154 and laterally by tool-mounted guides 1156) is first rotated about a horizontal axis so that the components of the subassembly 110 can be located to the datum at the top of the cells 100. This rotational step is completed prior to compression to reduce the height difference from one cell to another which is helpful in promoting secure joining of the busbar (not shown) by placing the surfaces as close as possible prior to joining. It will be appreciated by those skilled in the art, that the choice of engineering solutions for the rotation step can include hard tooling (not pictured) or slight compression (not pictured) or similar means that prevent the components from coming apart. After that, a compression force is imparted 180° about the axial dimension of the soft stack through the moveable holding tool 1154 toward the stationary holding tool 1152. This compression is to a predetermined force and distance It will be appreciated by those skilled in the art, that the force and displacement for compression will be related to the cell chemistry and cooling fin design with typical compression forces ranging from one hundred to four thousand Newtons and a compressive displacement of one to thirty millimeters. Once this predetermined level is reached, a box-like frame (not shown, but for example configured as a U-shaped structure with its own end plate with interlocking features) is secured around the compressed stack (such as by laser, resistance or mechanical attachment), after which the compressing force is released so that the frame continues to keep the stack intact along the stack's lateral edgewise dimension. From this, the unit is rotated back 180° about the horizontal axis, after which optional barcode and related scanning operations may take place. Finally, the frame's cover (which includes wiring harnesses, busbars, connectors and ancillary electronic equipment, possibly all embodied in an integrated cell sensing board (ICSB)) is attached to the righted stack and frame. These frame addition and cover adding steps are shown as 1030. From this, the busbars are welded 1035. In a preferred form, steps 1030 and 1035 are conducted in an automated (rather than manual) process, as open high voltage contacts could jeopardize nearby workers, while cleanliness requirements would likewise be easier to maintain. In an even more preferred form, the electrical connections (such as those associated with the busbars and other ICSB components) can be performed in a busbar joining station (not shown) where—once the unit is received in a secure way therein, indexing and welding steps are performed. The welding activities—which preferably are used to secure electrical connections between the busbars and the tabs 105A, 105B that extend from each of the cells 100—can be any conventional form, including ultrasonic welding or resistance welding or laser welding, and may also be supplemented with mechanical fastening or the like.

After the welding 1035 of the busbars is completed, a quality control (QC) and electrical step 1040 is conducted. For example, barcodes representing the serial numbers of various module 10 components can be affixed to permit subsequent identification of certain components. Likewise, testing on electrically interconnected equipment, such as voltage, temperature sensing module (VTSM) boards, voltage, current and temperature module (VITM), voltage, current and control module (VICM), as well as the aforementioned busbars and other exposed electrical contacts can be performed. Additional testing may also be conducted on the welds used on the busbars or related equipment. Once the testing and related QC checks have been performed, movement of the finished module 10 (such as through a manual or automated guiding cart or conveyor) to other work stations on the factory floor for additional assembly steps can be conducted. Such steps may include assembling the modules 10 into larger pack-like components; this may include attaching trays and bulkheads (such as tray 2 and bulkhead 4 from FIG. 1), installation of cooling fluid equipment (i.e., hoses 3 as shown in FIG. 1, tubes or the like) and leak testing (using, for example, an air mass flow or related non-liquid technique) and pressure testing of the same, attaching electrical buses, fuses and related wiring and control circuitry, as well as insulation 8 and cover 9 to the tray 2 (also from FIG. 1), electrical testing of the various modules 10 within battery pack 1, connecting vehicular attachment hardware (such as a crossbar or related bracket (not shown), to the top battery pack 1, application of appropriate barcodes, labels and related component identifiers, final quality inspection and transferral to a shipping rack or related container, and then on to a vehicle assembly plant for installation into a vehicle.

While certain representative embodiments and details have been shown for purposes of illustrating the invention, it will be apparent to those skilled in the art that various changes may be made without departing from the scope of the invention, which is defined in the appended claims.

What is claimed is:

1. A system for assembling a battery module from a plurality of individual battery cells, the system comprising:
   a conveyor comprising a plurality of conveyor belts such that a first cell and fin combination defining a first tab orientation is conveyed along a first conveyor belt of the plurality of conveyor belts while a second cell and fin combination defining a second tab orientation is conveyed along a second conveyor belt of the plurality of conveyor belts;
   a plurality of lifters configured to adjust the orientation of at least one individual battery cell of the plurality of individual battery cells along each of the first and second conveyor belts;
   at least one cam cooperative with at least one of the first and second conveyor belts and the plurality of lifters such that upon contact between at least one of the plurality of lifters and the at least one cam, the at least one of the plurality of lifters contacts a respective first or second of the cell and fin combinations to effect a change in orientation thereof;
   at least one stationary guide cooperative with at least one of the first and second conveyor belts to promote an alternating aligned placement of the first and second cell and fin combinations into a stack while the alternatingly aligned first and second cell and fin combinations are in a vertical orientation;
   a receiving device to receive the stack from the conveyor;
   a compressing device to compress the stack once the stack has been delivered to the device to receive;
   a placing device to place a support frame onto the stack while the stack is in its compressed state; and
   a securing device to secure at least one electrical component to the supported stack.

2. The system of claim 1, wherein the first and second conveyor belts are arranged parallel to one another.

3. The system of claim 1, further comprising a stack-rotating device to rotate the stack about its horizontal axis prior to subjecting the stack to the compressing device.

4. The system of claim 1, wherein spacing between the plurality of lifters along a dimension of the conveyor is such that upon placement of at least one of the first and second cell and fin combinations into the vertical orientation by an adjacent pair of the plurality of lifters, any leaning deviation of the at least one of the first and second cell and fin combination is eliminated at least until the stack is formed on the receiving device.

5. The system of claim 4, wherein the receiving device defines a box-like structure comprising vertically upstanding members on a plurality of sides and a movable upstanding structure on at least one side such that upon movement of the movable upstanding structure against at least one end of the stack, the stack becomes compressed in the box-like structure.

6. The system of claim 1, further comprising a mechanical arm configured to index a group of the alternatingly aligned first and second cell and fin combinations into position to capture an end of the group that is remote from the receiving device and pull the group toward the receiving device.

7. The system of claim 6, wherein motion of the mechanical arm is faster than a travel speed imparted to the group by the conveyor.

8. A system comprising:
   a first conveyor configured to convey a plurality of first cell and fin combinations in a first tab orientation;
   a second conveyor configured to convey a plurality of second cell and fin combinations in a second tab orientation;
   a plurality of lifters cooperatively coupled to the first conveyor and the second conveyor, each of the plurality of lifters configured to adjust an orientation of a respective one of the plurality of first cell and fin combinations and the plurality of second cell and fin combinations;
   at least one cam cooperative with the first conveyor and the plurality of lifters such that each of the plurality of lifters contacts a respective one of the plurality of first cell and fin combinations to effect a change in orientation to a vertical orientation upon contact between the respective lifter and the at least one cam;

at least one guide cooperative with a respective one of the first conveyor and the second conveyor to promote an alternating aligned placement of the plurality of first cell and fin combinations and the plurality of second cell and fin combinations into a stack while the plurality of first cell and fin combinations and the plurality of second cell and fin combinations are in the vertical orientation, the guide being stationary relative to the respective one of the first conveyor and the second conveyor;

an outfeed carrier configured to receive the stack from the conveyor;

a movable holding tool configured to assist in compression of the stack after the stack is disposed within the outfeed carrier;

a support frame configured to be placed onto the stack while the stack is in a compressed state and maintain the compressed state; and at least one electrical component configured to be secured to the support frame and the stack.

9. The system of claim 8, wherein the stack defines a horizontal axis and is rotated about the horizontal axis prior to entering the compressed state.

10. The system of claim 8, wherein spacing between the plurality of lifters along a dimension of the conveyor is such that upon placement of at least one of the first and second cell and fin combinations into the vertical orientation by an adjacent pair of the plurality of lifters, any leaning deviation of the at least one of the first and second cell and fin combination is eliminated at least until the stack is formed on the outfeed carrier.

11. The system of claim 8, further comprising a mechanical arm configured to index a group of the alternatingly aligned first and second cell and fin combinations into position to capture an end of the group that is remote from the outfeed carrier and pull the group toward the outfeed carrier.

12. The system of claim 11, wherein motion of the mechanical arm is faster than a travel speed imparted to the group by the conveyor.

* * * * *